(12) United States Patent
Melliere et al.

(10) Patent No.: US 11,496,543 B2
(45) Date of Patent: Nov. 8, 2022

(54) SYSTEM AND METHOD FOR CONFIGURATION AND INTERCHANGING OF BUSINESS FUNCTIONALITY IMPLEMENTATIONS

(71) Applicant: Genesys Telecommunications Laboratories, Inc., Daly City, CA (US)

(72) Inventors: Paul L. Melliere, Durham, NC (US); Robert Adams, Indianapolis, IN (US); Aydan Yumerefendi, Raleigh, NC (US); Andrew Crowell, Seattle, WA (US); Shawn Axsom, Indianapolis, IN (US)

(*) Notice: Subject to any disclaimer, the term of this patent is extended or adjusted under 35 U.S.C. 154(b) by 0 days.

(21) Appl. No.: 16/900,048

(22) Filed: Jun. 12, 2020

(65) Prior Publication Data
US 2020/0304602 A1   Sep. 24, 2020

Related U.S. Application Data

(63) Continuation of application No. 15/073,696, filed on Mar. 18, 2016, now abandoned.

(51) Int. Cl.
| | |
|---|---|
| *G06F 15/16* | (2006.01) |
| *H04L 67/01* | (2022.01) |
| *H04L 67/02* | (2022.01) |
| *H04L 67/53* | (2022.01) |
| *H04L 67/63* | (2022.01) |

(52) U.S. Cl.
CPC ............ *H04L 67/01* (2022.05); *H04L 67/02* (2013.01); *H04L 67/53* (2022.05); *H04L 67/63* (2022.05)

(58) Field of Classification Search
CPC ....... H04L 67/42; H04L 67/327; H04L 67/02; H04L 67/20; H04L 67/32
USPC ...... 709/203, 200, 224; 705/28, 44; 717/120, 717/124
See application file for complete search history.

(56) References Cited

U.S. PATENT DOCUMENTS

| | | | | |
|---|---|---|---|---|
| 6,484,276 | B1* | 11/2002 | Singh | G06F 11/263 |
| | | | | 714/38.13 |
| 6,845,505 | B1* | 1/2005 | Adunuthula | G06F 9/4843 |
| | | | | 718/104 |
| 2002/0035559 | A1* | 3/2002 | Crowe | G06F 16/24564 |
| 2004/0205613 | A1* | 10/2004 | Li | G06F 16/986 |
| | | | | 398/82 |
| 2005/0033794 | A1* | 2/2005 | Aridor | H04L 67/42 |
| | | | | 709/200 |
| 2009/0106413 | A1* | 4/2009 | Salo | G06F 21/552 |
| | | | | 709/224 |
| 2009/0113392 | A1* | 4/2009 | Wijenayake | G06F 8/20 |
| | | | | 717/124 |

(Continued)

*Primary Examiner* — Thuong Nguyen

(57) ABSTRACT

A system and method are presented for invoking integration actions in a unified collaboration system. A client communicates with a bridging web server through a ReST. The bridging web server comprises a cloud service which facilitates communication with integration servers, which may be located on-premises. In an embodiment, the integration server(s) host a number of plugins which are capable of implementing integration actions. The bridging web server decides which action implementation is the best one to service a request. The implementation may be based on prior configuration. Routing decisions on the bridging web server may be automatically selected based on prior configuration.

11 Claims, 5 Drawing Sheets

(56) References Cited

U.S. PATENT DOCUMENTS

| | | | |
|---|---|---|---|
| 2010/0060909 A1* | 3/2010 | Conescu | G06Q 10/06 358/1.9 |
| 2011/0098985 A1* | 4/2011 | Lawson | G06F 30/13 703/1 |
| 2013/0191509 A1* | 7/2013 | Loughry | G06F 9/541 709/219 |
| 2013/0232079 A1* | 9/2013 | Lindelsee | G06Q 20/00 705/44 |
| 2014/0169767 A1* | 6/2014 | Goldberg | G11B 27/031 386/282 |
| 2016/0057207 A1* | 2/2016 | Li | H04L 67/10 709/203 |
| 2016/0146862 A1* | 5/2016 | Cai | G01R 31/69 324/128 |
| 2016/0253620 A1* | 9/2016 | Pollock | G06Q 10/087 705/28 |
| 2017/0186110 A1* | 6/2017 | Carpenter | G06Q 50/12 |
| 2017/0272547 A1* | 9/2017 | Melliere | H04L 67/02 |
| 2020/0250664 A1* | 8/2020 | Kumar | H04L 63/083 |
| 2020/0304602 A1* | 9/2020 | Melliere | H04L 67/42 |

* cited by examiner

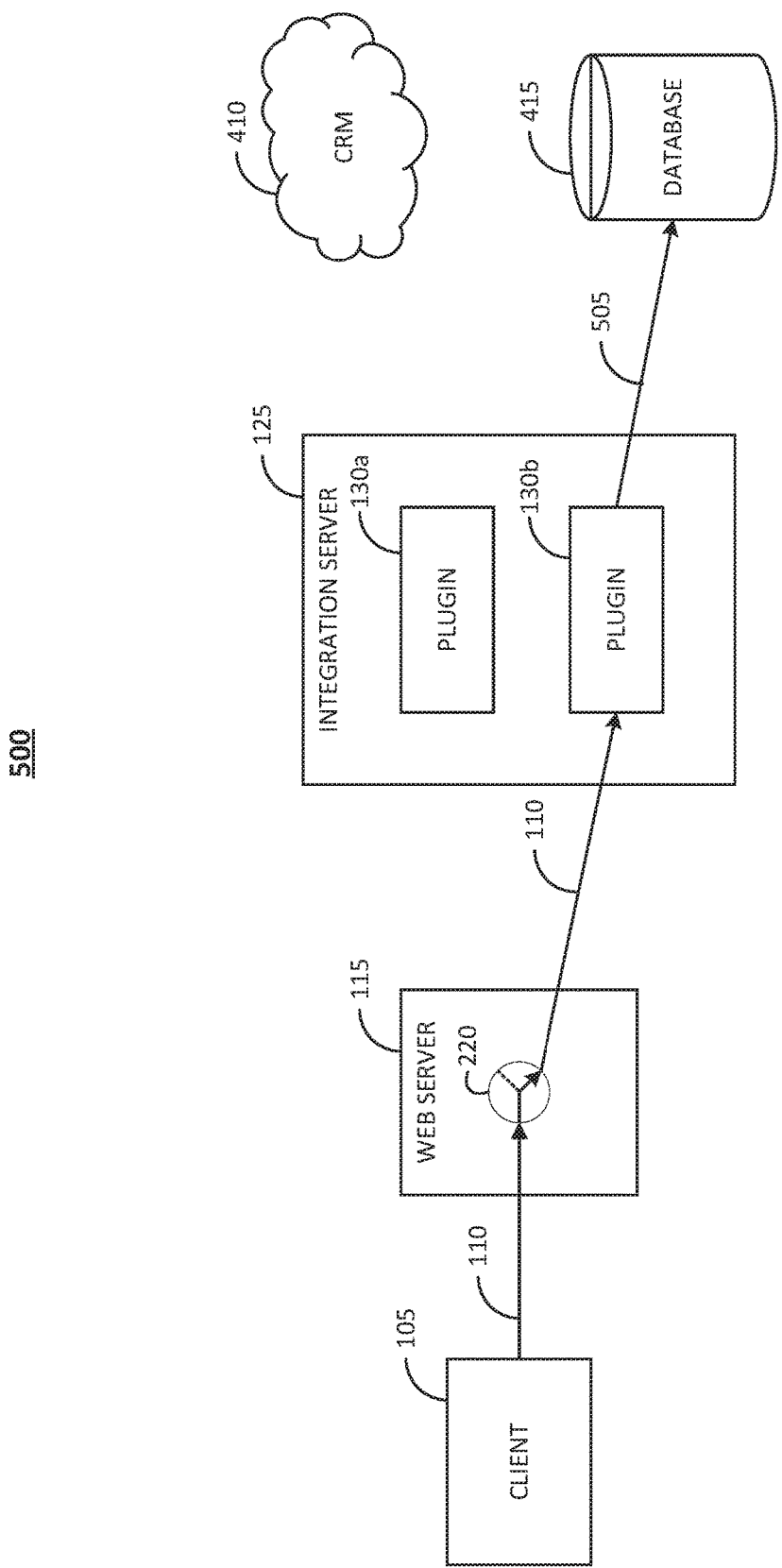

SYSTEM AND METHOD FOR CONFIGURATION AND INTERCHANGING OF BUSINESS FUNCTIONALITY IMPLEMENTATIONS

CROSS REFERENCE TO RELATED APPLICATION

This application claims the benefit of U.S. patent application Ser. No. 15/073,696, similarly titled "SYSTEM AND METHOD FOR CONFIGURATION AND INTERCHANGING OF BUSINESS FUNCTIONALITY IMPLEMENTATIONS", filed in the U.S. Patent and Trademark Office on Mar. 18, 2016, the contents of which are incorporated herein.

BACKGROUND

The present invention generally relates to telecommunications systems and methods, as well as unified collaboration systems. More particularly, the present invention pertains to integration actions within the unified collaboration systems.

SUMMARY

A system and method are presented for invoking integration actions in a unified collaboration system. A client communicates with a bridging web server through a ReST. The bridging web server comprises a cloud service which facilitates communication with integration servers, which may be located on-premises. In an embodiment, the integration server(s) host a number of plugins which are capable of implementing integration actions. The bridging web server decides which action implementation is the best one to service a request. The implementation may be based on prior configuration. Routing decisions on the bridging web server may be automatically selected based on prior configuration.

In one embodiment, a method is provided for invoking integration actions in a unified collaboration system, wherein the system comprises at least a client operatively connected to a web server, wherein the web server is operatively connected to an integration server, the method comprising the steps of: establishing communication, by the client, with the web server, wherein the web server comprises a routing decision mechanism; communicating, by the web server, with the integration server, wherein the integration server comprises a plurality of plugins capable of implementing the integration actions; and deciding, by the web server, which integration action to perform wherein the deciding is based at least in part on prior configuration of the web server.

In another embodiment, a method is provided for invoking integration actions in a unified collaboration system, wherein the system comprises at least a client operatively connected to a web server, wherein the web server is operatively connected to an integration server, the method comprising the steps of: establishing communication, by the client, with the web server, wherein the web server comprises a routing decision mechanism; communicating, by the web server, with the integration server, wherein the integration server comprises a plurality of plugins capable of implementing the integration actions; and deciding, by the web server, which integration action to perform wherein the deciding is based at least in part on a failsafe mechanism.

BRIEF DESCRIPTION OF THE DRAWINGS

FIG. 5 is a diagram illustrating an embodiment of invoking customer action with a database implementation.

DETAILED DESCRIPTION

Figure 1:
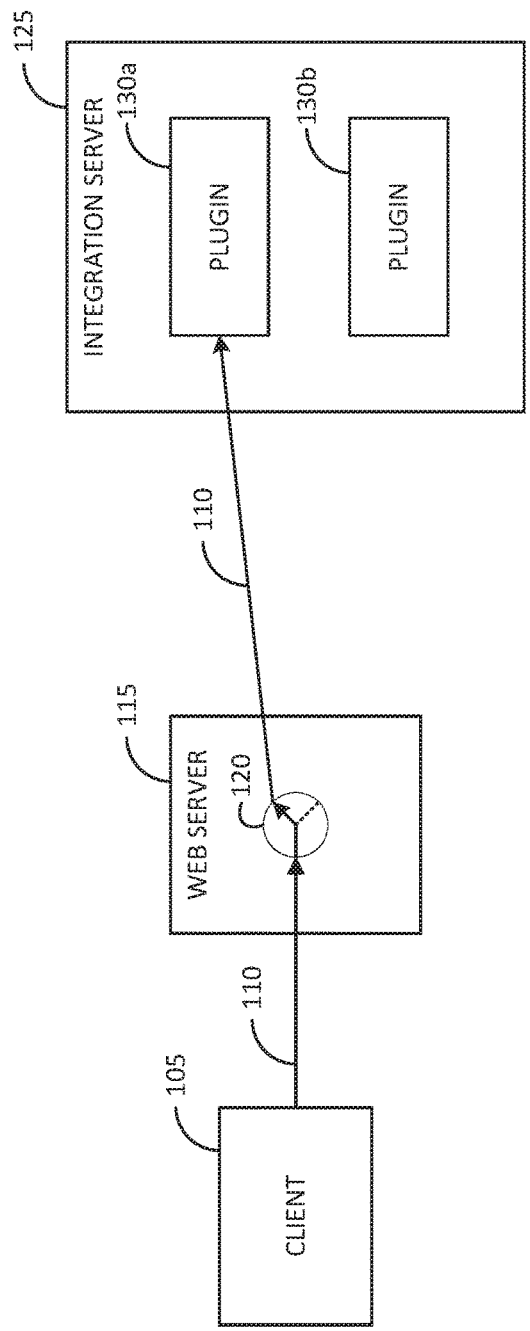
FIG. 1 is a diagram illustrating an embodiment of invoking an integration action.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Integration actions may be used in contact center applications for interaction flow construction or scripts. A bridge might refer to system of integration which allows integration (or bridging) of a platform with third party applications. Without integration actions, these types of systems would have to contain connection details and other technical information necessary to perform a business function (such as finding a user in a database by looking up the user's phone or contact number). Connection information and other details behind how to retrieve that user data are contained in the integration action. In an embodiment, the application needs to only know what the inputs are (e.g., the phone number), what the outputs will be (e.g., a user record), and the URL to invoke the action. Applications know which business functions they want to perform, but they don't know how to perform that operation. Integration actions provide the mechanics to performing an operation and can be altered without updates to the application itself. Without integration actions, the mechanics would have to be installed prior to disbursement. Updates would be required to the application whenever the mechanics are out of date, such as when credentials are updated or a new Customer Relationship Management (CRM) system is deployed.

Integration actions provide individuals without software development knowledge the ability to change implementations (and hence the behavior) behind a ReST request without needing to write code and without notifications or changes to the clients invoking the action. Thus, a source of where a specific piece of data is obtained may be changed without the client needing to be aware that a change was even made. Integration server plugin developers may be provided a .NET API through which they are able to expose an action implementation, making it available to the customer to configure as an action endpoint. An action may have a constant URL and schema for inputs and outputs; however, the specific bridge plugin instance that provides the implementation is allowed to change at a customer's request.

A single action may thus be implemented by plugins such as a CRM (e.g., Salesforce) plugin, a workforce management system plugin, and a database plugin (e.g. Oracle, Microsoft SQL). A customer is able to change their action configuration to change between these implementations as dictated by business needs, without requiring any changes to clients consuming this action.

In an embodiment, integration actions comprise a layer between clients consuming a ReST API and plugins, which provide some implementation for that action. FIG. 1 is a diagram illustrating an embodiment of invoking an integration action, indicated generally at 100. Components might comprise a Client 105, a Bridging Web Server 115, and an Integration Server 125 which further comprises at least one Plugin 120.

The client 105 might comprise a unified collaboration service or a UI component which requires a business function that an action provides, such as applications for constructing call flows by a flow author, to name a non-limiting example. In an embodiment, because integration actions are exposed via HTTP communications, the client 105 should be capable of communicating HTTP and handling JSON bodies.

The client 105 communicates with the bridging web server 115 via a Representational State Transfer (ReST) 110. The bridging web server 115 communicates with the integration server 125, also via ReST. The integration server 125 may host a number of plugins 130 which are capable of implementing integration actions. The bridging web server 115 comprises a cloud service (such as a cluster of machines running in AWS) that facilitates communication with integration servers 125. The routing decision mechanism 120 on the bridging web server 115 is selected based on the configuration by a customer. When an integration action is invoked, the bridging web server 115 decides which integration action implementation is the best one to fulfill the action request based on customer configuration. Integration actions may be created or edited by a customer, or selected from a list of available plugins to decide which one will fulfill the integration action request. Integration servers 125 exist on a customer's premises and the bridging web server(s) 115 provide a communication channel to the integration servers 125 for invoking methods on plugins 130a and 130b. Plugins 130 define one or more integration action implementations. There is no practical limit to the number of plugins that can be created or the number of integration action implementations that a single plugin can implement. In this example, two are shown (130a and 130b) as a non-limiting example for simplicity.

Figure 2:
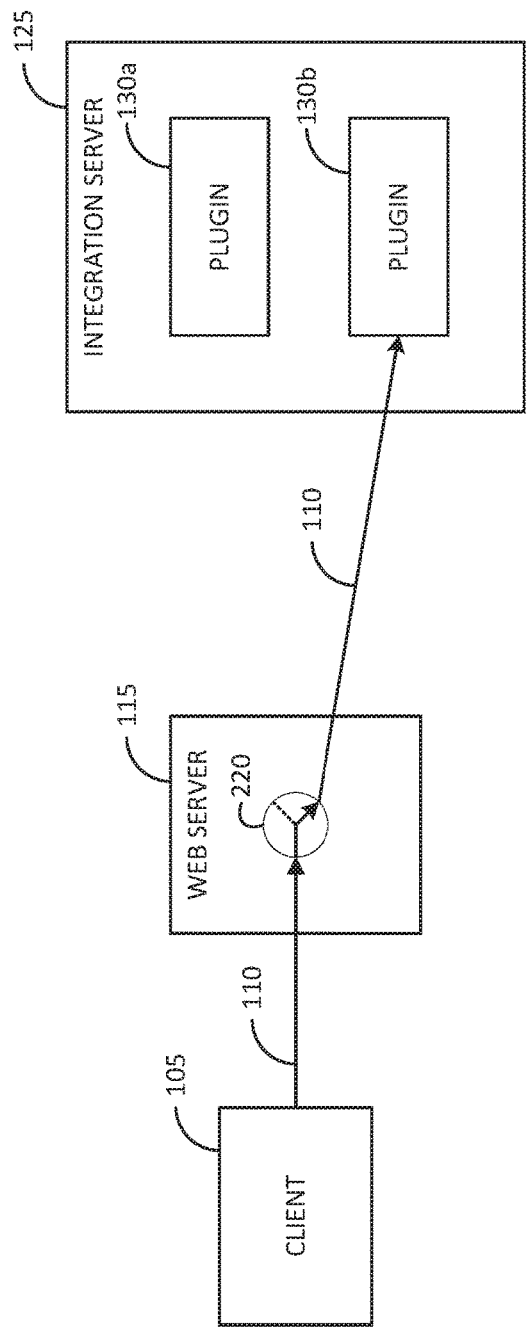
FIG. 2 is a diagram illustrating an embodiment of invoking an alternate integration action implementation after a configuration change has occurred.

FIG. 2 is a diagram illustrating an embodiment of invoking alternate integration action implementation after a configuration change has occurred, indicated generally at 200. Similar to the embodiment illustrated in FIG. 1, the routing decision mechanism 220 on the bridging web server 115 is selected based on the configuration by a customer. When an integration action is invoked, the bridging web server 115 decides which action implementation is the best one to fulfill the action request based on customer configuration. Integration actions may be created or edited by a customer or selected from a list of available plugins to decide which one will fulfill the action request. Integration servers 125 exist on a customer's premises and the bridging web server(s) provide a communication channel to the integration servers 125 for invoking methods on plugins 130. Plugins 130 may define one or more integration action implementations. In embodiment non-limiting example, the routing decision mechanism communicates with the plugin 130b via the integration server 125 which delegates to the plugin 130b.

Figure 3:
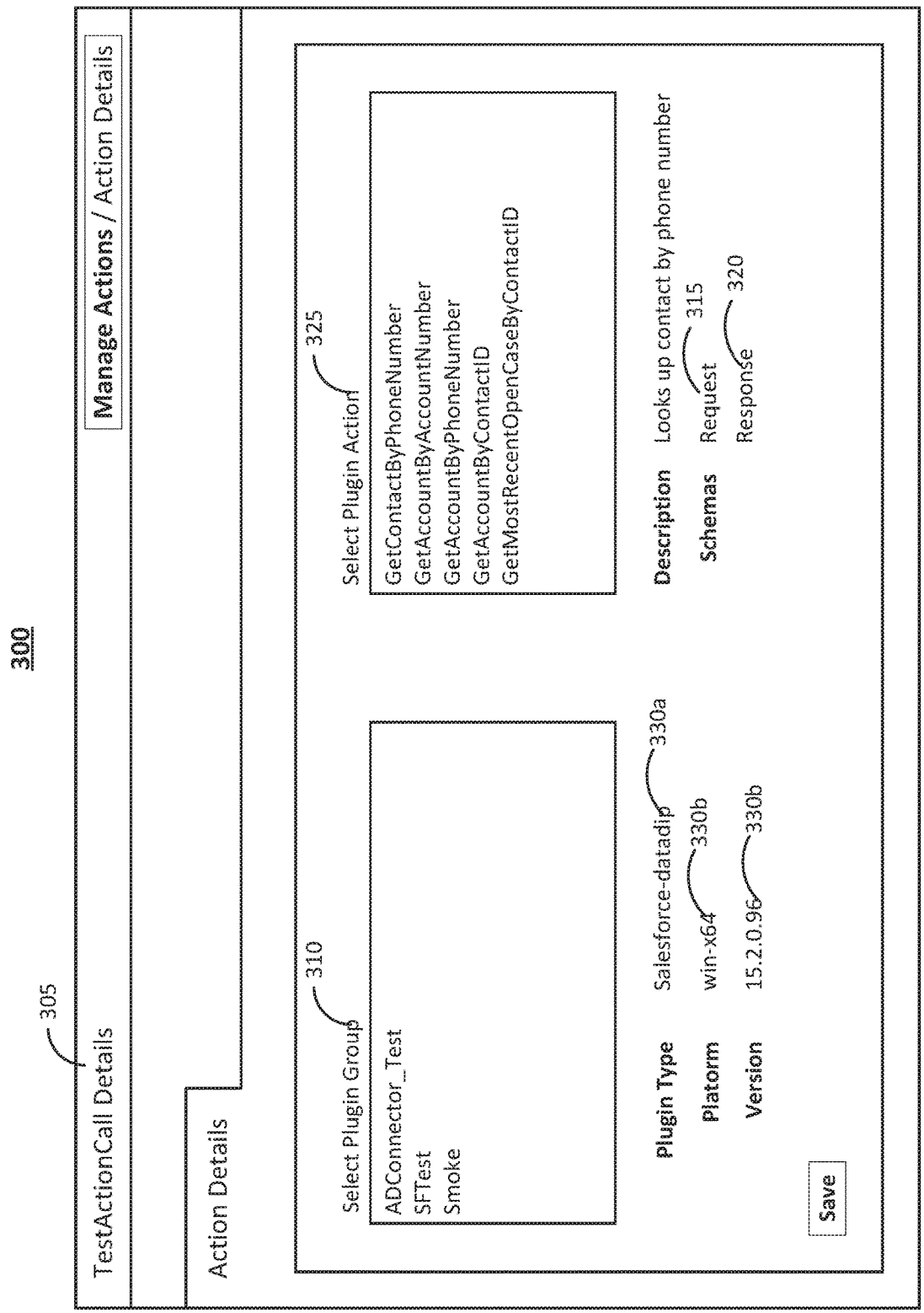
FIG. 3 is a diagram illustrating an embodiment of an integration action configuration.

FIG. 3 is a diagram illustrating an embodiment of an integration action configuration, indicated generally at 300. Once a plugin has been deployed to an integration server, the integration action implementations that are defined in that plugin become available for selection in the configuration UI 300 for integration actions, and subsequently available for the integration web server to use when fulfilling an integration action invocation. Prior to use, an integration action may be setup by defining information such as an action name 305, a plugin group 310, a request schema definition 315, a response schema definition 320, a plug-in action 325, and plug-in information 330. The action name 305 may comprise a description of the integration action. In FIG. 3, the action name 305 is "TestActionCall Details", for example. In an embodiment, schema may be defined in JSON schema. The plugin group 310 represents a cluster of plugin instances that are available to fulfill an action request. In an embodiment, it is a failover mechanism and can act as a replacement in the event another plugin failure. A request schema definition 315 defines the inputs to the action including the property names and any constraints on the property values. The response schema definition 320 comprises the outputs that the action will provide, including the property names and any constraints on the property values. Implementation of an integration action may comprise a .NET method defined as part of a plugin. The method might have an input parameter corresponding to the integration action request schema and a return value corresponding to the integration action response schema. By installing and configuring an integration server plugin, the bridge platform may be made aware of what integration action implementations the integration server plugin has. The bridging platform may then present the implementation for selection in the integration action configuration. In the diagram 300, the plug-in action 325 selected is "GetContactByPhoneNumber". Other information 330 may also be listed in the UI, such as the plugin type 330a (Salesforce) and other system information 330b (supporting platform and version).

Figure 4:
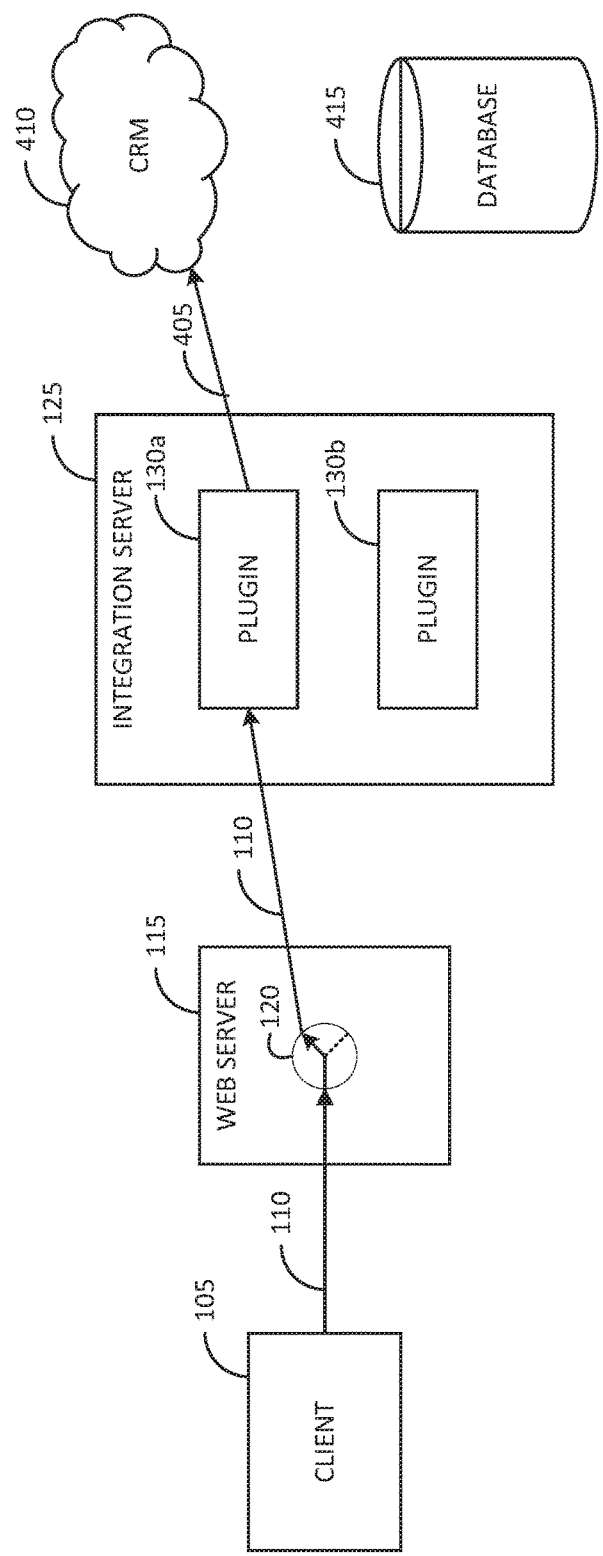
FIG. 4 is a diagram illustrating an embodiment of invoking customer action with a customer relationship management software service.

After being configured, the integration action may be invoked by contacting a ReST endpoint, with the HTTP request path containing the name of the action to be invoked. The bridging platform then determines which integration action implementation has been configured to fulfill the requested action. The bridging platform may then translate the request body from JSON to a .NET object, and call the .NET method. The bridging platform may then wait for the method to return, translate the returned .NET object into JSON, and return the HTTP response to the client. FIG. 4 is a diagram illustrating an embodiment of invoking customer action with a customer relationship management software service, indicated generally at 400.

Integration actions may hide implementation details about how a customer-specific business function is performed. The actions may be used to provide a single entry point to a service that is capable of providing a specific business function in a number of ways, without the client having to know which code is being used to provide that functionality. In an embodiment, a common use may be abstracting away the implementation behind looking up a caller's identity information given their phone number. An integration action may be created that provides a contract which accepts a phone number in the request and returns the customer's name, address and account number. Multiple integration action implementations would be created for this, perhaps one that retrieves the information from a database 415, such as Oracle, and one that retrieves the information from a CRM 410, such as Salesforce.com. A customer would then be able to choose which implementation is the right one for their business and even swap out these implementations at will via the integration action configuration, without the client ever knowing something has changed. In FIG. 4, information is retrieved 405 from Salesforce.com 410 via an integration action. Alternatively, FIG. 5 is a diagram illustrating an embodiment of invoking customer action with a database implementation, indicated generally at 500. In FIG. 5, information is retrieved 505 from a database associated with Oracle 415.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for identifying a plugin module and invoking integration actions for a plurality of third-party applications with a unified collaboration system, wherein the system comprises at least a client device operatively connected to a web server, wherein the web server is operatively connected to an integration server, the method comprising the steps of:

receiving, by the web server, a request from the client device, to invoke an integration action to retrieve information from one of the plurality of third-party applications to execute one or more operations of a call flow, wherein the integration action comprises a layer between the client device and the integration server consuming a Representational State Transfer (ReST) API and a plurality of dynamic plugin modules hosted on the integration server which provide implementation for the integration action, wherein the integration action is alterable by a customer without necessitating an update to the plurality of third-party applications;

communicating, by the web server, with the integration server, wherein the integration server comprises the plurality of dynamic plugin modules configured to fulfill the integration actions, and wherein the dynamic plugin modules comprise changeable action configurations that are configurable by the customer to perform a specific business function, wherein the integration action conceals, from the client device invoking the integration action, how the specific business function is performed and conceals the type of code employed to provide the specific business function;

identifying, by the web server, a first dynamic plugin module of the plurality of dynamic plugin modules to execute the one or more operations of the call flow, wherein the identifying performed by a previously defined configuration of the web server, wherein the first dynamic plugin module is unavailable for fulfilling the request;

identifying, by the web server, a second dynamic plugin module of the plurality of dynamic plugin modules, wherein the second dynamic plugin module is available for fulfilling the request, and invoking the integration action using the second dynamic plugin module to execute the one or more operations of the call flow to the integration server to connect the unified collaboration system with the one of the plurality of third-party applications by contacting an endpoint associated with the ReST API with an HTTP request path containing the name of the integration action, wherein the invoking further comprises:

determining, by a bridging platform the configuration of the integration action;

translating the request to a .NET object from JSON and calling a .NET method; and waiting for the .NET method to return, translated the returned .NET method into JSON, and return to the client device.

2. The method of claim 1, wherein the web server comprises a cloud-based service for facilitating communication with the integration server.

3. The method of claim 1, wherein the client device comprises one of: a service of the unified collaboration system or a user interface component, wherein the user interface component includes the specific business function.

4. The method of claim 1, wherein the integration server is located on-premises.

5. The method of claim 1, wherein the dynamic plugin modules each define one or more integration action implementations.

6. The method of claim 1, wherein the previously defined customer configuration comprises a manual configuration or an automatic configuration.

7. The method of claim 1, wherein the integration action configuration can be altered at any time in the process without disruption of the unified collaboration system.

8. The method of claim 1, wherein the third party application comprises one or more of: a customer relationship management system, a database, and a workforce management system.

9. The method of claim 1, wherein the integration actions have been manually configured to include one or more of: defined inputs to the integration action; defined outputs that the integration action provides; an identifier wherein the identifier is used by the client device to specify which specific business function to perform; and a plugin grouping.

10. The method of claim 9, wherein the defined inputs comprise property names and constraints on the property values and the defined outputs comprise property names and constraints on the property values.

11. The method of claim 9, wherein the plugin grouping comprises a cluster of plugin instances that are available to fulfill a request of the integration action.

\* \* \* \* \*